W. L. DE REMER.
GUARD RAIL PLATE.
APPLICATION FILED FEB. 3, 1911.
1,111,141.
Patented Sept. 22, 1914.
5 SHEETS—SHEET 1.
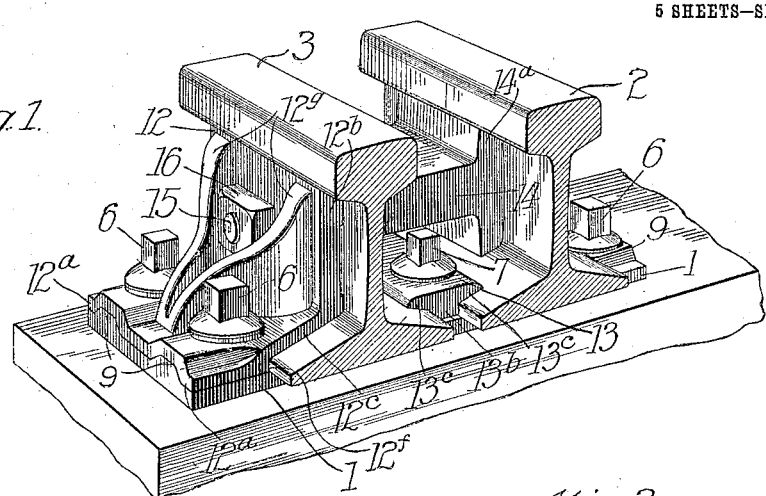
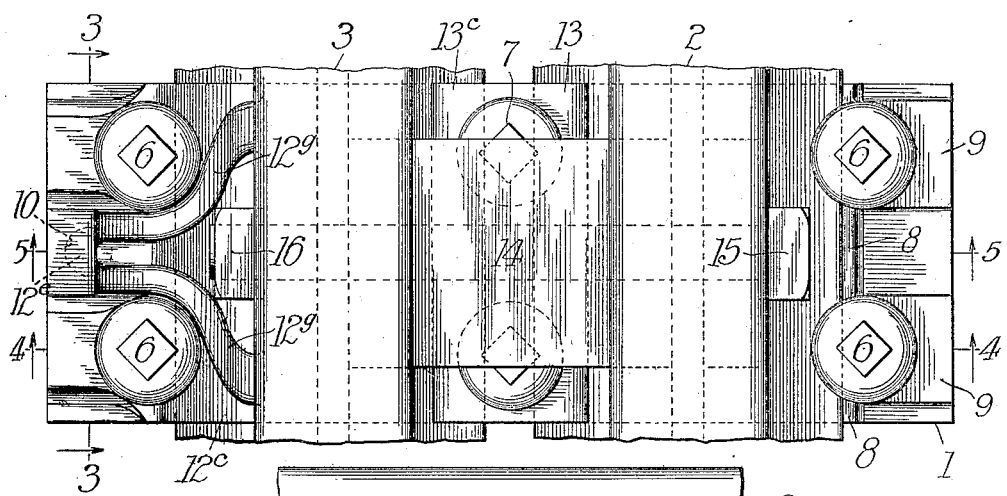

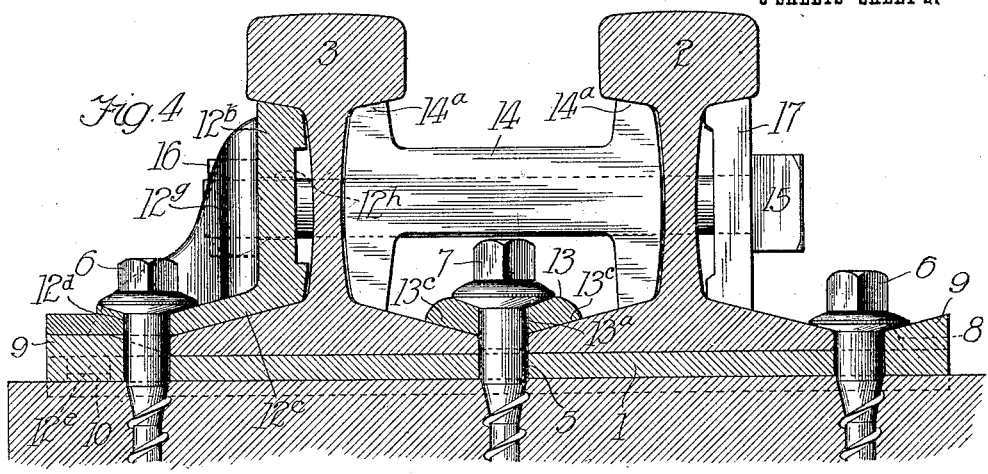
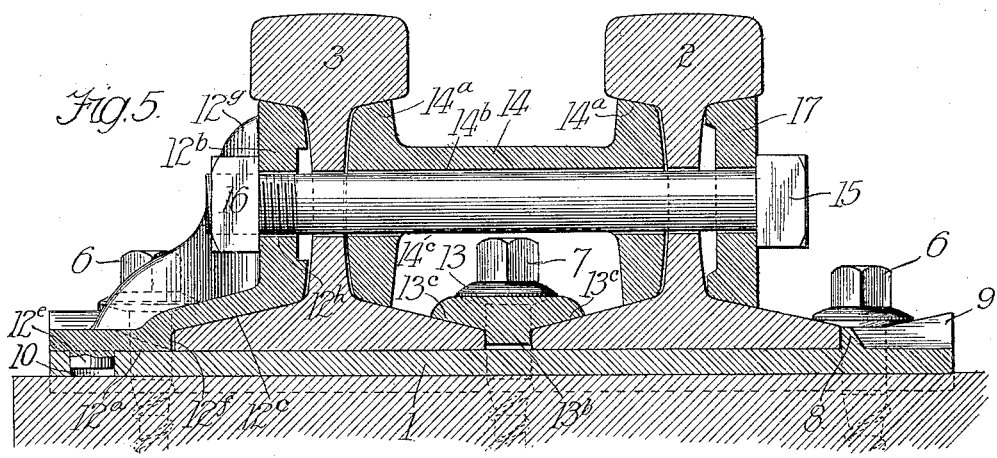
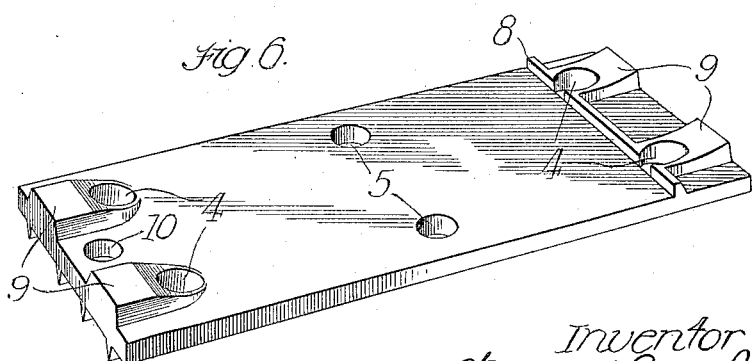

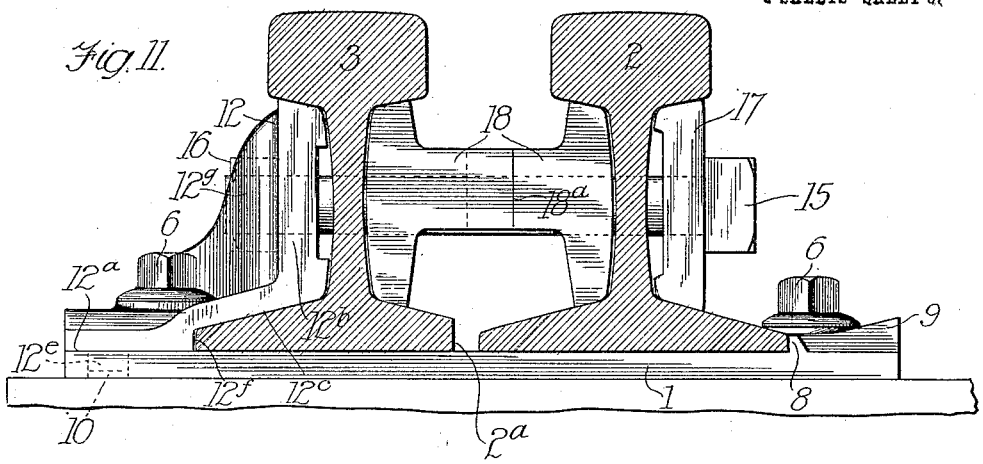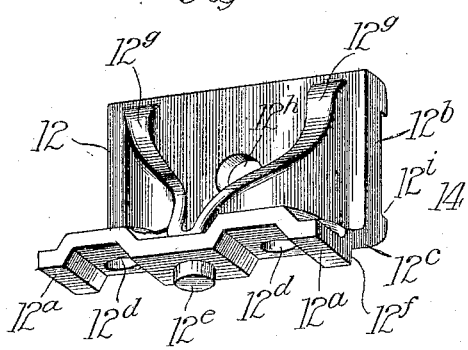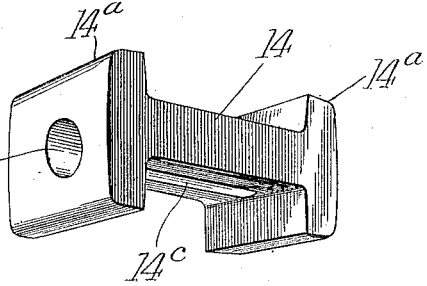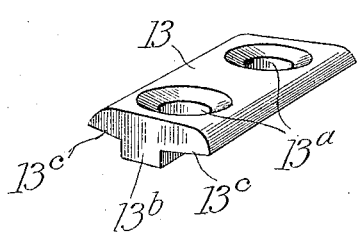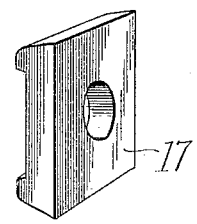

W. L. DE REMER.
GUARD RAIL PLATE.
APPLICATION FILED FEB. 3, 1911.
1,111,141. Patented Sept. 22, 1914.
5 SHEETS—SHEET 4.
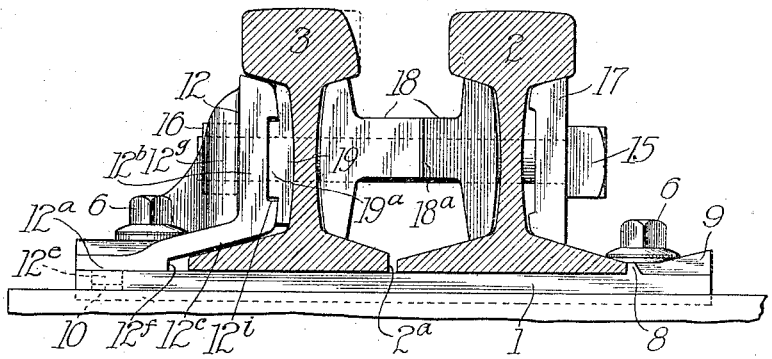
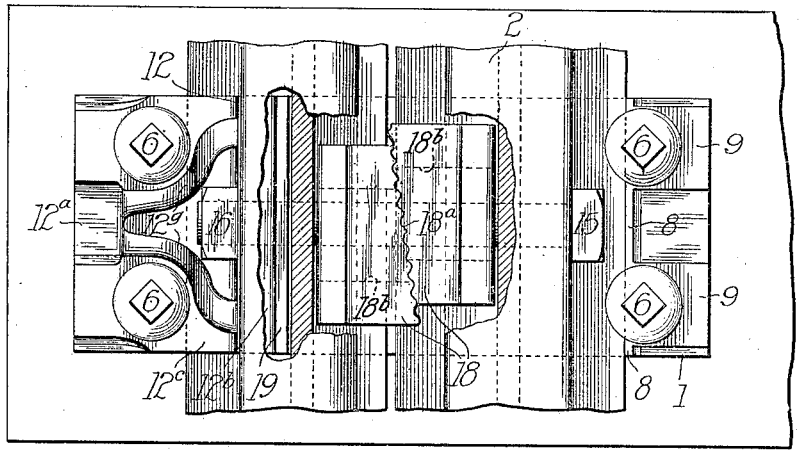
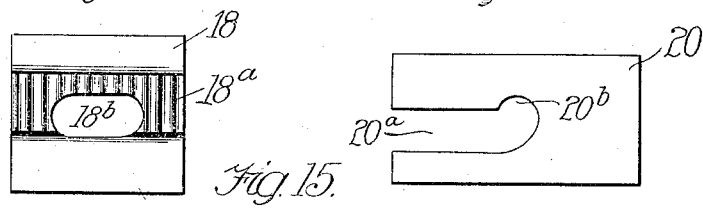

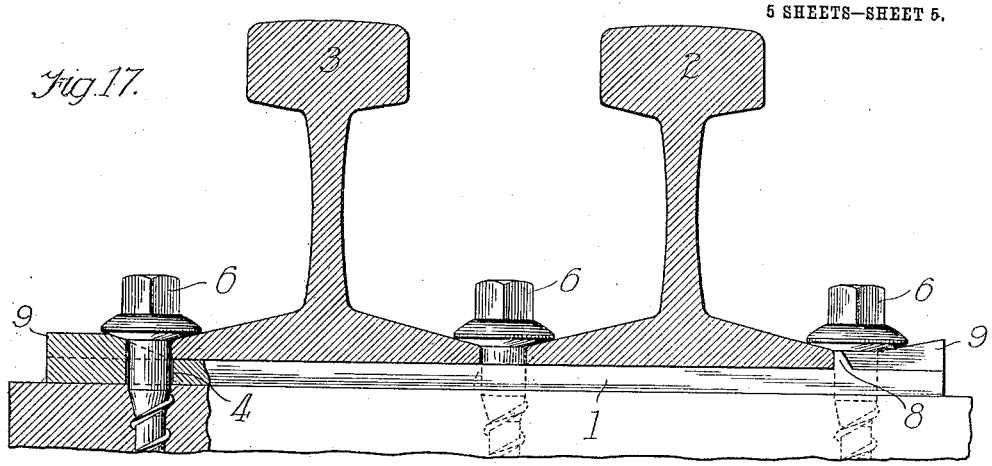
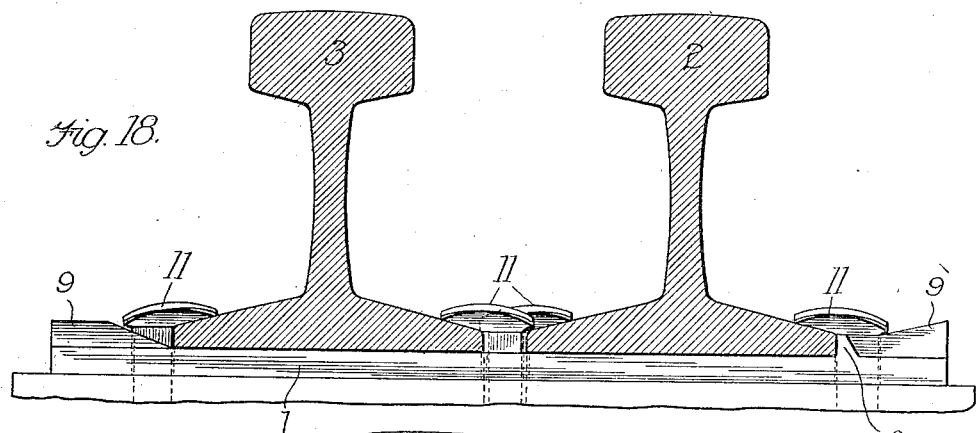
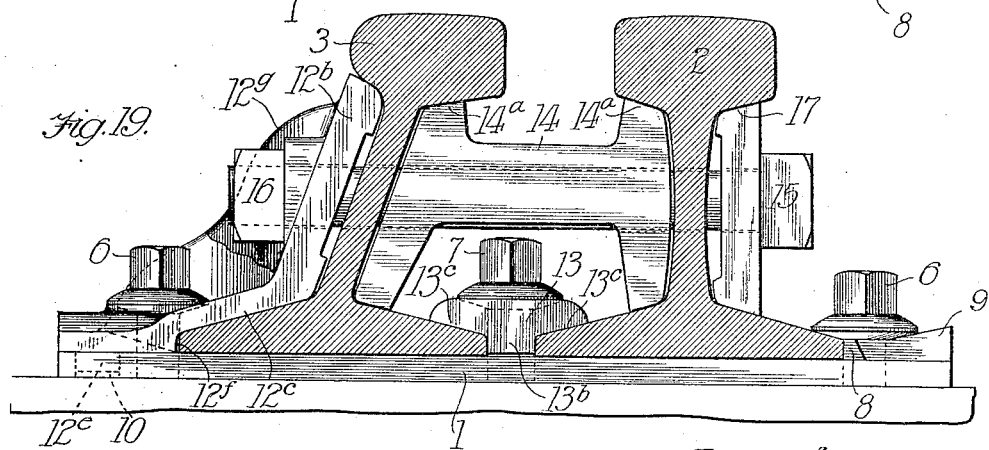

UNITED STATES PATENT OFFICE.

WILLIAM L. DE REMER, OF CHICAGO, ILLINOIS.

GUARD-RAIL PLATE.

1,111,141.		Specification of Letters Patent.		Patented Sept. 22, 1914.

Application filed February 3, 1911. Serial No. 606,392.

*To all whom it may concern:*

Be it known that I, WILLIAM L. DE REMER, a citizen of the United States, residing at Chicago, Cook county, Illinois, have invented certain new and useful Improvements in Guard-Rail Plates, of which the following is a specification.

My invention relates to tie plates, more particularly to tie plates for guard rails, and the object thereof is to provide a novel form of such tie plate together with a guard rail brace and also a spreader or clip arranged between the adjacent flanges of the two rails, the plate brace and clip being secured to the tie by suitable fastening means such as spikes or bolts, but preferably screw-spikes, thereby providing a perfect bond between the running rail and the guard rail and the tie. The tie plate is made of such construction and the said parts coöperating therewith are so arranged as to prevent spike abrasion by the rails, to which end the tie plate and brace are provided with shoulders and the clip with double shoulders, against which shoulders the edges of the rail flanges bear. In order to meet the more severe conditions I also provide between the rails a filler block and through bolt which passes through said block, the two rails and the brace, thereby rigidly clamping the two rails together above the base and near the line of lateral pressure of the wheel flanges so that all chance of springing the flangeway is eliminated.

The various features of novelty and utility in my tie plate and brace construction will be apparent from the description hereinafter given.

In the drawings Figure 1 is a perspective of my tie plate and brace construction, together with the filler block, portions of the running rail and guard rail being shown in section; Fig. 2 a plan view thereof; Fig. 3 a sectional elevation on the line 3—3 of Fig. 2; Fig. 4 a section on the line 4—4 of Fig. 2; Fig. 5 a section on the line 5—5 of Fig. 2; Fig. 6 a perspective of the tie plate line; Figs. 7 to 10 both inclusive perspectives of the brace, filler block, clip and washer respectively; Fig. 11 a section similar to Fig. 4; Fig. 12 an end view of a modified form of structure, the rails being in section; Fig. 13 a plan view thereof with portions broken away to show the adjustable filler block; Fig. 14 an end view of one section of such block; Fig. 15 a detail view of the shim; Fig. 16 a detail view of a modified form of shim; Fig. 17 a section of my tie plate with the brace filler block and clip omitted and illustrating the employment of screw spikes; Fig. 18 a similar view but illustrating the use of square spikes; and Fig. 19 a view similar to Fig 4 but showing the construction when the guard rail is made inclined to contract the width of the flangeway.

My invention pertains primarily to the novel construction of the tie plate itself, secondly to the production of a novel form of brace coöperating with such tie plate, thirdly the production of a spacer or clip also coöperating with such tie plate, and fourthly the provision of a filler block coöperating with the rails and with the other parts of my structure. It will be understood that the different parts mentioned may be used altogether in a complete structure, particularly where the most severe conditions are encountered, or that one or more of said parts may be omitted, excepting that the tie plate is employed under all conditions. With this understanding I will proceed to describe the complete structure using all of said parts as illustrated in Fig. 1 as well as in Figs. 12 and 13 wherein the filler block is shown adjustable.

Referring to Figs. 1 to 10, the tie plate 1, which is preferably of rolled metal, is made of a length of say from 13 to 15 inches, according to the size of the rail section and is adapted to receive the two rails, to-wit, the running rail 2 and the guard rail 3. As more clearly shown in Fig. 6 this plate is provided near its ends with the spike holes 4 and intermediate its length with other spike holes 5, these sets of holes being in the present instance circular so as to receive the outer sets of bolts or the screw spikes 6 as shown and the inner set of spikes 7. The tie plate is provided on its upper face with a transverse shoulder 8 against which an edge of the flange of the running rail bears. All of the outer spike holes 4 are substantially surrounded by bosses 9 which are beveled on top at an angle corresponding to the angle of the rail base, the under side of spike heads being similarly beveled or inclined to insure firm and perfect contact between the spike and the plate and rail base. The tie plate is also provided near one end and between the pair of bosses with a hole 10 to receive a dowel in the brace as hereinafter explained. The structure as thus far described, that is to say the tie plate itself, constitutes my invention in its simplest and broader form and the same may be utilized as a guard rail plate without the other parts as seen in Fig. 17, where screw spikes are employed, or as seen in Fig. 18 where the driven or square spikes are employed.

Referring to the complete structure as shown in Fig. 1, the rail brace 12 which is shown by itself in perspective in Fig. 7 comprises a substantially horizontal portion $12^a$, the vertical portion $12^b$ and an inclined intermediate portion $12^c$. The horizontal portion is formed to the shape or contour of the outer end of the plate outside of the guard rail upon which it bears, that is to say, it receives the upwardly extending bosses, with the result that the brace interlocks with the tie plate. This portion of the brace is also provided with holes $12^d$ corresponding with the set of spike holes 4, so that the same spikes 6 which pass through that end of the tie plate also hold the brace in place. Furthermore this portion of the brace is provided with a depending dowel $12^e$ which fits into the hole 10 in the tie plate and assists in rigidly holding the brace and tie plate together. By reason of this construction the rail brace is immovable on the plate independently of the spikes.

The intermediate portion $12^c$ of the brace is inclined on an angle corresponding with the inclination of the rail base or flange upon which it bears, there being a shoulder $12^f$ at the junction between the horizontal portion and the intermediate portion of the brace, against which the edge of the flange of the guard rail bears to prevent spike abrasion. The vertical portion $12^b$ of the brace is adapted to fit against the web and head of the guard rail, serving to effectually brace said rail and overcome any lateral pressure of the wheel flanges. This brace is also provided with wings or outwardly directed flanges $12^g$ which serve not only to strengthen the brace but also to prevent the turning of the nut on the through bolt hereinafter mentioned, the vertical portion of this brace being provided with a hole $12^h$ for such bolt.

The clip or spreader consists of a bar or plate 13 shown in detail in Fig. 9 having two countersunk holes $13^a$ which register with the holes 5 in the tie plate and through which the bolts or the screw spikes 7, as shown, pass, these holes being counterbored or socketed at their upper ends to correspond with the bevel on the underside of the heads of the spikes. This bar or plate has a depending portion $13^b$ of a width to fill the space between the adjacent flanges of the two rails, this depending portion forming two side or lateral portions $13^c$ which bear upon the flanges of the rails and are correspondingly inclined for this purpose. This clip, which may also be termed a center lock, performs several functions. First, it maintains rail spacing on the tie plate; second, it prevents any vertical movement of the rail and buckling of the plate; third, it eliminates spike abrasion from rail thrust or spike cutting from rail travel, and, fourth, it relieves the rail brace from excessive shock.

The filler consists of a block 14 shown separately in Fig. 8 and comprising an intermediate horizontal portion terminating in two heads $14^a$ which bear against the webs of the two rails and also against their heads and flanges for securely spacing the upper portions of the two rails. A hole $14^b$ passes horizontally through this block and by preference such hole is open at its under side through the intermediate portion at $14^c$. This hole is to receive the through bolt 15 which passes through the two rails, through the block and through the brace, the nut 16 being prevented from rotating by means of the wings $12^g$ of such brace. In order to bring the head of the bolt outside the line of the rail to permit of the turning thereof by a wrench, I interpose the washer 17 between such head and the rail, such washer being preferably of the form illustrated in Figs. 10 and 11 to aid in supporting the head of the rail.

The above described structure provides an efficient and rigid connection or bonding of the different parts to each other and to the tie and moreover the parts thereof firmly brace and space the rails. Furthermore, the construction of the parts is such that there is no danger of spike abrasion or cutting by the rails inasmuch as all of the spikes are effectually protected by means of shoulders adjacent the spike openings, as for instance the transverse shoulder 8 on the tie plate, the transverse shoulder $12^f$ on the brace and the double shoulders formed by the depending portion $13^b$ of the clip.

In Figs. 12 and 13 I have shown substantially the same structure as illustrated in Figs. 1 and 2 with the exception that the filler or block is made adjustable and a shim is employed in connection with the brace. The object of the adjustability of this block is to permit of the movement or adjustment of the guard rail toward the running rail to compensate for the wear on the head of the guard rail, thereby keeping the channel way of the proper width. For the purpose of clearly illustrating the object of this modified structure I have shown in Fig. 12 an extreme case of such wear of the guard rail, requiring an extreme adjustment. Describing such structure, the filler block instead of being in a single piece as shown in Fig. 8 is made in two pieces or sections 18, one of which is illustrated in end view in Fig. 14. The block is divided on an angle through its intermediate portion and the meeting edges 18ª are correspondingly corrugated or serrated so as to engage. By moving the two sections upon each other the length of the block as a whole is increased or diminished according to the direction of the movement. In Fig. 13 the two sections are shown as having been adjusted to permit of contraction in the length of the block to enable the guard rail to be moved closer to the running rail. Both sections of the block are provided with an oblong hole or opening to receive the through bolt 15 and to permit of the said movement or adjustment of said sections. In the present instance I have shown the brace 12 as being non-adjustable thereby providing a more rigid structure although the same might be made adjustable to follow up the guard rail to its adjusted position. However, I prefer the rigid structure shown and in order to compensate for the movement or adjustment of the guard rail I employ a shim 19 of a thickness equaling the amount of movement or adjustment of the guard rail, such shim being interposed between the brace and the web of the guard rail as shown in Fig. 12. Shims of different thickness may be provided from which a shim of the desired thickness can be selected. The shim may partake of different forms of construction but I prefer that illustrated in Figs. 12 and 15 according to which the shim interlocks with the rail brace by means of its outward extension 19ª which fits into the recess 12ⁱ in the vertical portion of the rail brace. Each shim has a slot 19ᵇ entering from one side and adapted to be slipped over the through bolt when being placed in position. As shown in Fig. 12 the upper and lower portions of the shim are made to fit more or less closely the contour of the rail and the brace against which they bear. As shown in Fig. 16 the shim 20 instead of interlocking with the rail brace may be made flat, that is, unprovided with any extension for interlocking purposes and the opening 20ª entering from one side may be provided with a recess 20ᵇ at its inner end to fit or lock over upon the through bolt. It will be understood that as above stated Fig. 12 represents an exaggerated condition, the base of the guard rail not ordinarily being separated from the flange 12ᶠ of the brace as much as shown in said figure and the surface 12ᵉ of such brace being maintained in substantial contact with the inclined surface of such base even after adjustment of the guard rail. After the foregoing description the manner of assembling or disassembling the parts of this modified structure as well as the adjustment of such parts will be readily understood. The slide filler block or spreader first described is intended for maximum clearances, as occur in bridge docks, curvatures, etc., while the adjustable block or spreader is intended for minimum clearances between the heads of the rail as used adjacent railway frogs, etc.

As hereinbefore stated, it is not necessary that all of the parts described be used in the same combination, but that one or more of such parts may be omitted. For instance, as I have said, all of the said parts except the tie plate may be omitted to form the simple structures illustrated in Figs. 17 and 18, representing my invention in its simpler and broader aspect. As shown in Fig. 11, the tie plate, brace and filler are retained, but the spreader or clip is omitted. In this particular construction a minimum width of flangeway is shown with the result that it becomes necessary to slightly trim off one edge of the flange or base of one of the rails—the guard rail in the present instance, as shown at 2ª. According to Fig. 19 all of said parts are retained, but in this particular instance the guard rail is of the inclined type so as to provide for the minimum amount of flangeway without the necessity of the trimming or cutting off any portion of the rail flange. Of course it follows that the brace is slightly modified as to the angle of its portion 12ᵇ which, instead of being vertical as in the first instance, is inclined to correspond with the inclination of the web of the guard rail as clearly shown in Fig. 19.

The fastening means employed may be either spikes of any desired kind, or bolts, according to the particular place of use and consequently it will be understood that wherever in the specification and claims I have referred to spikes or screw spikes, their equivalents such as bolts or other similar fastenings are included.

I claim:

1. A guard-rail tie-plate comprising a plate of a length to receive two rails and having intermediate its length spike holes to receive spikes coöperating with inner adjacent sides of the flanges of the two rails, a filler block arranged between the two rails, in combination with a clip adapted to be positioned between the inner adjacent flanges of the rails and having spike holes adapted to register with said intermediate spike holes in the plate, said clip being independent of the block and located in a plane below it.

2. A guard-rail tie-plate comprising a plate of a length to receive two rails and having intermediate its length spike holes to receive spikes coöperating with inner adjacent sides of the flanges of the two rails, a filler block arranged between the two rails, in combination with a clip consisting of a bar having a depending central portion fitting between the inner adjacent flanges of the rail, the remainder of the under surface of the bar being inclined to correspond with the shape of the rail flanges upon which it bears, said clip having spike holes to register with said spike holes in the plate, and independent of and located in a plane below the filler block.

3. A guard-rail tie-plate comprising a plate of a length to receive the running rail and the guard-rail and having near its opposite ends holes for spikes coöperating with the outer sides of the flanges of the two rails, in combination with a brace adapted to coöperate with the outer side of the guard-rail and having spike holes corresponding with the spike holes in that end of the plate, and a filler adjustable in length and adapted to be located between the rails, a shim located between the head and flange of the rail and interposed between the guard rail and brace and a bolt adapted to pass through said rails, brace, filler and shim.

4. A guard-rail tie-plate comprising a plate of a length to receive the running rail and the guard rail and having near its opposite ends holes for spikes coöperating with the outer sides of the flanges of the two rails, in combination with a brace adapted to coöperate with the outer side of the guard rail and having spike holes corresponding with the spike holes in that end of the plate, and a filler adjustable in length and adapted to be located between the rails, a shim adapted to interlock with the brace and to be interposed between the guard rail and brace.

5. A guard-rail tie-plate comprising a plate of a length to receive the running rail and the guard rail and having near its opposite ends holes for spikes coöperating with the outer sides of the flanges of the two rails, in combination with a brace adapted to coöperate with the outer side of the guard-rail and having spike holes corresponding with the spike holes in that end of the plate, and a filler adapted to be located between the rails, and a bolt passing through said rails, brace and filler said brace having wings, and the bolt having a nut prevented by said wings from turning.

6. A guard-rail tie-plate comprising a plate of a length to receive the running rail and the guard rail and having near its opposite ends holes for spikes coöperating with the outer sides of the flanges of the two rails, in combination with a brace adapted to coöperate with the outer side of the guard rail and having spike holes corresponding with the spike holes in that end of the plate, a filler adapted to be located between the rails, a bolt passing through said rails, brace and filler, a nut on said bolt adjacent said brace, and a washer located at the head of the bolt to bring such head outside the line of the adjacent rail, said washer also coöperating with the latter rail.

WILLIAM L. DE REMER.

Witnesses:
S. E. HIBBEN,
ROBERT DOBBERMAN.

---

Copies of this patent may be obtained for five cents each, by addressing the "Commissioner of Patents, Washington, D. C."